June 21, 1960 L. F. AKKERON 2,941,916
HEAT RESISTANT DECALCOMANIA TRANSFER AND METHOD
OF MAKING AND USING THE SAME
Filed Oct. 19, 1956
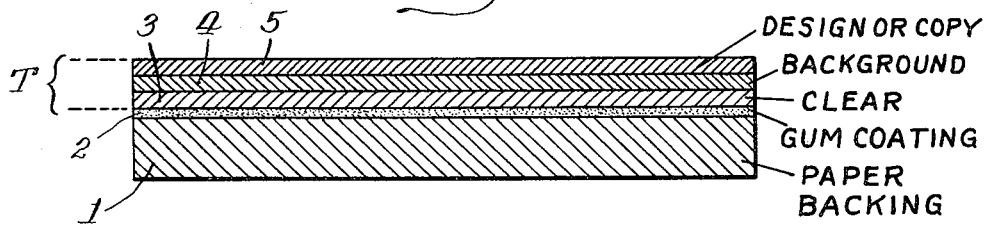
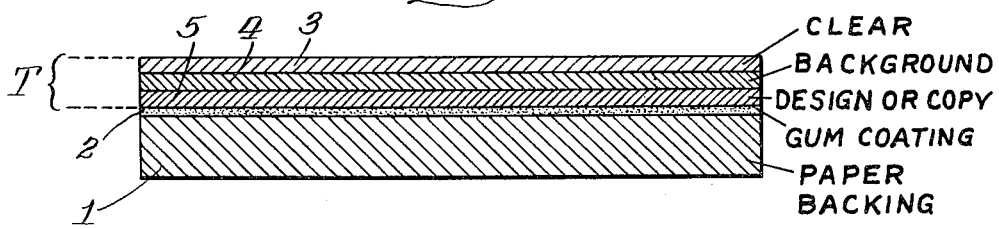
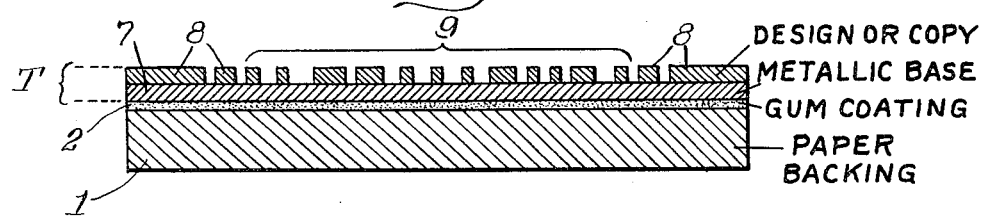
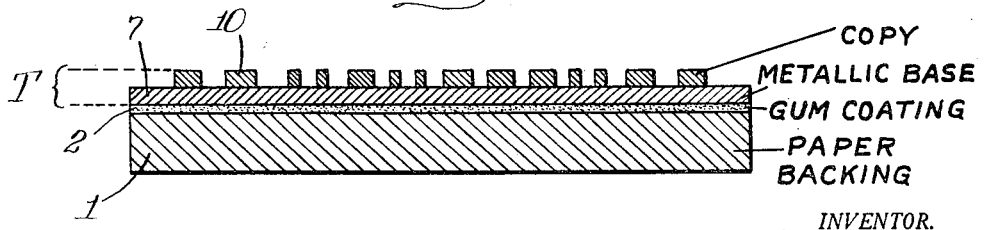
INVENTOR.
Ludwig F. Akkeron,
BY
Davis Lindsey Hibben & Noyes
Attys United States Patent Office 2,941,916
Patented June 21, 1960

2,941,916
HEAT RESISTANT DECALCOMANIA TRANSFER AND METHOD OF MAKING AND USING THE SAME

Ludwig F. Akkeron, Chicago, Ill., assignor to The Meyercord Co., Chicago, Ill., a corporation of Illinois Filed Oct. 19, 1956, Ser. No. 617,157

17 Claims. (Cl. 154—95)

This invention relates to improvements in the decoration or marking of metallic surfaces and articles which are intended to be subjected to elevated temperatures. More particularly, the invention relates to a novel decalcomania transfer for use in decorating or marking such surfaces.

Decalcomania transfers of various well known types are widely used in industry as a rapid, inexpensive, and extremely convenient technique for applying a desired decoration, legend, or identifying indicia to an article or surface. However, prior to the present invention the decalcomania transfer technique has not been applicable in the case of articles or surfaces which must be subjected to elevated temperatures on the order of about 300 to 1000° F., the problem being particularly acute if such article or surface undergoes a wide variation in temperature. For example, in the usual decalcomania transfer the transfer body comprises one or more layers of a resinous film forming material such as a cellulose ester or ether, particularly cellulose nitrate, ethyl cellulose, and cellulose acetate. Obviously, all such film forming materials will burn or char in the neighborhood of 300 to 350° F. Of course, vitreous or ceramic type decalcomania transfers are known in which the transfer body must be applied to the article and then fired at a temperature in excess of about 1100° F. in order to develop the desired properties, but such transfers have only limited utility in the decoration or marking of various vitreous and ceramic surfaces such as glassware, chinaware, and pottery. Consequently, there is a well defined need for a heat resistant decalcomania transfer which can be used satisfactorily in the decoration and marking of metal articles, such as the walls of furnaces and ovens, stacks, exhaust outlets and mufflers and other parts of combustion engines, etc., which are subject to a wide temperature variation ranging up to 1000° F. or even higher.

Accordingly, it is a primary object of the present invent to provide a novel heat resistant decalcomania transfer adapted for the decoration and marking of articles and surfaces which must be subjected to elevated temperatures.

Another object of the invention is to provide a novel method of making a decalcomania transfer of the aforementioned type.

A further object of the invention is to provide a novel method, involving the use of the aforementioned decalcomania transfer, for the decoration or marking of metal surfaces which are subjected to elevated temperatures.

Other objects and advantages of the invention will become apparent from the subsequent detailed description taken in conjunction with the accompanying drawing, wherein:

Fig. 1 is a diagrammatic cross-sectional view on an exaggerated scale of a decalcomania transfer comprising one specific embodiment of the present invention;

Fig. 2 is a view similar to Fig. 1 showing a modification of the first embodiment;

Fig. 3 is a similar view showing another embodiment of the invention; and

Fig. 4 is a similar view showing a modification of the Fig. 3 embodiment.

In order to obtain the desired high temperature resistance and other required properties, my invention relies primarily on the use of the silicone or organosiloxane resins as the principal ingredients in the transfer body. However, as will hereinafter appear in greater detail, I have found that in order to obtain all of the physical and chemical properties required during manufacture of the decalcomania, during storage and handling of the transfer prior to use thereof, and also during use of the transfer and subsequent exposure of the transfer body to high temperatures, it is necessary to employ a predetermined and selected blend of organosiloxane resins as well as other ingredients.

According to E. G. Rochow (The Chemistry of Silicones, Second Edition, 1951), the silicones or organosiloxanes are based on a silicon-oxygen structure to which various organic radicals are attached, and the three fundamental types of organosiloxanes (oils, rubber, and resins) may be considered as being built from three unit structures which Rochow has conveniently called M, D, and T units as follows:

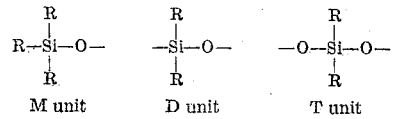

As will be evident, the M unit is monofunctional, the D unit is difunctional and the T unit is trifunctional. In the formation of silicone or organosiloxane polymers, the M units can be used only for dimers or as end units or chain stoppers. Linear polymers can be produced from the D units with M units as the terminating groups. Cross-linked polymers can be produced from the T units. Therefore, the three general types of organosiloxane materials referred to above can be considered as having the following arrangement of M, D and T units:

Silicone oils: $M(D)_xM$, where $x$ is a small number
Silicone rubber: $M(D)_xM$, where $x$ is a very large number
Silicone resins: MDT combinations The R groups are ordinarily methyl or phenyl groups. In the organosiloxane resins the characteristic structural feature is that the silicon atoms are linked into branched or cross-linked chains through silicon-oxygen bonds, and the organic radicals are connected to silicon by silicon-carbon bonds. In all commercially available resins, the extent of cross-linking of the various molecules will be somewhat less than the maximum possible degree of cross-linkage thereby providing some residual curing properties so that the resins can be converted to a highly temperature resistant and insoluble material by subsequent "baking" or exposure to elevated temperatures. For illustrative purposes, a typical arrangement of an organosiloxane resin might be visualized as follows:

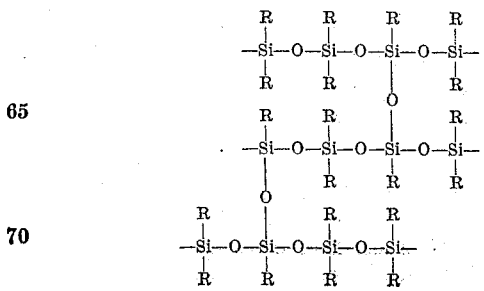

The organosiloxane resins range in properties from hard, brittle, glass-like materials to viscous oils. Usually they are colorless, or nearly so, and are readily soluble in aliphatic and aromatic hydrocarbon solvents. Ordinarily, these solutions are low in viscosity even at relatively high resin concentrations. In the manufacture of decalcomania transfers the general procedure is to apply to a temporary backing or support a succession of films, layers, or imprints in desired superimposed relation with intermediate drying between layers so as to form a unitary transfer body which can be released from the backing when desired and adhered to an article or surface. The present invention follows this same general procedure and each film, layer, or imprint is formed from a fluid material comprising normally solid organosiloxane resins in a suitable solvent medium. In general, the most useful organosiloxane resins for purposes of the present invention are the phenyl methyl siloxane polymers and the methyl phenyl diphenyl siloxane polymers, particularly those having from about 1.3 to about 1.95 methyl and phenyl groups per silicon atom.

In order to realize the full benefits and advantages of the invention, I prefer to employ a mixture of at least two, and preferably three, compatible normally solid organosiloxane resins of the foregoing character. One such resin is selected primarily for its temperature resistant properties, particularly its ability to be converted to a "cured" condition by exposure to elevated temperatures so as to develop maximum temperature resistant qualities and adherence for a metal surface. At least one additional organosiloxane resin is selected for its ability to overcome the brittle characteristics of the first resin so as to provide a transfer body which can be released from a paper backing or the like and which has practical and durable qualities both during storage and use. The additional organosiloxane resin or resins may also be chosen to provide a viscosity-increasing effect and to otherwise improve the printing characteristics of the fluid material which is employed to form the various films or layers of the transfer body. I have found that organosiloxane resins which have the best temperature resistance properties form relatively thin solutions of low viscosity when dissolved in a suitable solvent and are also unsuited in other respects for screen printing as ordinarily utilized in the manufacture of decalcomania transfers. The proportions of the different organosiloxane resins used may be varied to meet the requirements of a particular transfer with respect to life or durability, temperature stability, solvent resistance and adhesion.

In addition to the several different organosiloxane resins discussed above, other organosiloxane resins and organosiloxane fluids or oils may also be present to improve the overall qualities of the films. It is particularly important that the mixture include a relatively low molecular weight organosiloxane fluid, such as a phenyl methyl siloxane fluid, as a plasticizer for the uncured resins so as to impart good flexibility and shelf life to the transfer body during storage and handling. As will hereinafter appear, the mixture employed to form the various films or layers of the transfer body may also include, if desired, a suitable pigment, a thickener, an extender, and a drier or catalyst for facilitating subsequent curing of the transfer body upon exposure to heat. Of course, it will be understood that the various ingredients are initially composited in a suitable solvent or fluid medium such as an aromatic hydrocarbon, e.g. toluene or xylene or mixtures thereof, the glycol alkyl ethers or certain aliphatic esters such as butyl acetate.

In addition to the ingredients mentioned above, another important consideration of the present invention is the thickness of the transfer unit which is made up of a plurality of superimposed films or layers. In order to preserve the film integrity of the transfer body after it has been applied to a metal surface being decorated or marked and in order to prevent cracking, chipping, and popping-off of the applied transfer body, it is quite important that the total thickness of the transfer body be not greater than about .0025 inch and preferably not over .002 inch. Consequently, it is very important during the manufacture of the decalcomania transfer that every precaution be taken to avoid excessive film or layer thickness. In addition to other advantages, the screen printing technique which is so well known in the decalcomania transfer art is preferred because of the greater ease with which the thickness of a screen printed film or layer may be controlled.

Referring now to Fig. 1 of the drawing, one specific embodiment is shown comprising a decalcomania transfer of a type which is most suitable for use in the decoration or marking of metal surfaces which are subjected to temperatures on the order of 300° to 400° F. with an occasional intermittent temperature of as high as 600° F. In this case, the temporary carrier of the transfer comprises a porous paper backing 1 having the usual water soluble gum or dextrin coating 2. Immediately over the gum coating 2 of the paper backing is a clear unpigmented continuous film of organosiloxane resin designated at 3. This film 3 comprises a base or support for the transfer body. Superimposed over the film 3 is a second continuous film or layer 4 which in this instance is pigmented to provide a white background layer. Over the background layer 4 is superimposed a compound layer 5 which may include design work in color and copy or text material, as desired. It will, of course, be understood that each of the films or layers 3, 4, and 5 consists principally of heat resistant uncured organosiloxane resins, and the several layers 3 to 5 adhere together sufficiently to provide a unitary transfer body or transfer unit which is adapted to be released as whole from the paper backing 1 by moistening the latter with water so as to soften the gum coating 2 in the usual manner. Although a small amount of the softened gum coating 2 may adhere to the outside of the base layer 3 of the transfer body after the same has been released from the paper backing 1 and may serve to provide a temporary adhesive during the initial application of the transfer body to the article or surface being marked, generally it is preferred to wash the released transfer body free of gum because of the tendency of the latter to char during subsequent heat curing. For temporary adherence the organosiloxane resin film itself has a certain degree of natural tackiness which together with the effect of the water is sufficient to adhere the transfer body sufficiently for most purposes prior to curing. For the reasons heretofore mentioned, the total thickness of the transfer body (designated at T in Fig. 1) should not be in excess of .0025 inch and preferably not more than .002 inch.

During the manufacture of the decalcomania transfer shown in Fig. 1, each successive film or layer 3, 4, and 5 is applied by a suitable printing or coating technique, e.g. by screen printing, lithographic printing, spray coating, roller coating, etc. However, as previously indicated, the screen printing technique is by far the most suitable. As is the usual practice, each layer or film is dried before the next successive layer is applied.

Although the decalcomania transfer illustrated in Fig. 1 comprises a water release type transfer, it is to be understood that the invention contemplates any suitable type of temporary backing such as a heat release backing or a dry strip backing of the various types well known in the art.

For purposes of illustration and not by way of limitation, the following are typical batch formulations for the various fluid compositions which may be used in applying the layers 3, 4, and 5 by screen printing:

Clear base layer 3

| | |
|---|---|
| Methyl phenyl diphenyl siloxane resin having about 1.4 methyl and phenyl groups per Si atom with a methyl:phenyl ratio of about 0.84 (50 wt. percent resin solids in 50 wt. percent xylene) _____oz__ | 48 |
| Methyl phenyl diphenyl siloxane resin having about 1.3 methyl and phenyl groups per Si atom with a methyl:phenyl ratio of about 0.84 (75 wt. percent resin solids in 25 wt. percent glycol butyl ether) _____ oz__ | 9 |
| Phenyl methyl siloxane resin having about 1.5 methyl and phenyl groups per Si atom with a methyl:phenyl ratio of about 1.2 (50 wt. percent resin solids in 50 wt. percent toluene) _____oz__ | 60 |
| Diatomaceous earth suspension (1 part by wt. Celite, 2 parts by wt. aromatic naphtha) _____oz__ | 4 |
| Phenyl methyl siloxane fluid having about 2 methyl and phenyl groups per Si atom with a methyl:phenyl ratio of about 3 _____gm__ | 5.7 |
| Cobalt naphthenate (6% Co) _____gm__ | 1.6 |

In the foregoing formulation, the first listed resin constitutes the principal heat-resistant ingredient but the solution thereof in its solvent vehicle has poor screening properties and tends to form a brittle film which cannot be released easily from the paper backing. However, the inclusion of the remaining resins improves both the screen printing properties of the formulation and also contributes appreciably to the flexibility and release characteristics of the dried film or layer. The phenyl methyl siloxane fluid acts primarily as a plasticizer to preserve the desired flexibility of the film prior to use and curing of the applied transfer body and thereby maintaining proper shelf life and handling qualities of the transfer. However, there is some carry over of desirable plasticizing effect even after curing. Essentially these fluids are dimethyl siloxane polymers containing sufficient phenyl groups to effect compatibility with the phenyl-containing resins. The diatomaceous earth provides body and strength to the film and is usually desirable in the case of a clear or unpigmented film. Other similar particulate inorganic heat resistant materials may also be used for the same purpose. The cobalt naphthenate is a drier or catalyst to facilitate curing of the organosiloxane resins after the transfer has been used, i.e. after the transfer body 3—4—5 has been released from the backing and applied to a metal surface which is later exposed to an elevated curing temperature of from 300° F. to 1000° F. Many such drier or catalysts are known but the organic acid salts or soaps of cobalt, zinc, and sometimes iron are particularly useful. For most uses the cobalt and zinc soaps, such as cobalt and zinc naphthenates, oleates, etc., are preferred because of the tendency of iron to discolor light colored films and to diminish heat resistance somewhat.

White background layer 4

| | |
|---|---|
| Methyl phenyl diphenyl siloxane resin having about 1.4 methyl and phenyl groups per Si atom with a methyl:phenyl ratio of about 0.84 (50 wt. percent resin solids in 50 wt. percent xylene) _____oz__ | 30 |
| Methyl phenyl diphenyl siloxane resin having about 1.3 methyl and phenyl groups per Si atom with a methyl:phenyl ratio of about 0.84 (75 wt. percent resin solids in 25 wt. percent glycol butyl ether) _____ oz__ | 180 |
| White paste comprising equal parts by weight of titanium dioxide and phenyl methyl siloxane resin (described above for layer 3) and a few percent by weight of silica pellets _____oz__ | 160 |
| Phenyl methyl siloxane fluid (described above for layer 3) _____oz__ | 2 |
| Bentone 18C thickening agent (alkyl ammonium montmorillonite) _____gm__ | 36 |
| Cobalt naphthenate (6% Co) _____gm__ | 4 |

In the above formulation the silica pellets in the white paste function as an extender and binder. The Bentone (National Lead Co.) serves as a thickener or gelling agent to provide proper screening properties. Any of the cation-modified swelling clays are suitable for this purpose, e.g. dimethyl dioctadecyl ammonium bentonite.

Design layer 5

| | Gm. |
|---|---|
| Methyl phenyl diphenyl siloxane resin having about 1.4 methyl and phenyl groups per Si atom with a methyl:phenyl ratio of about 0.84. (50 wt. percent resin solids in 50 wt. percent xylene) _____ | 7.5 |
| Methyl phenyl diphenyl siloxane resin having about 1.3 methyl and phenyl groups per Si atom with a methyl:phenyl ratio of about 0.84. (75 wt. percent resin solids in 25 wt. percent glycol butyl ether) _____ | 280 |
| Blue paste comprising 63 wt. percent of cobalt-alumina pigment (F-6279 by Ferro Corp.) and 37 wt. percent phenyl methyl siloxane resin (described above for layer 3) _____ | 320 |
| Phenyl methyl siloxane fluid (described above for layer 3) _____ | 0.4 |
| Cobalt naphthenate (6% Co) _____ | 0.03 |

Obviously, other heat-resistant pigments may be incorporated in the same general type of formulation dependent upon the color desired for the design and copy portions of the compound layer 5.

In Fig. 2 a modification of the above-described transfer is shown. The arrangement shown in Fig. 1 where the design and/or copy layer 5 is visible at the exterior of the transfer is known in the art as a face-up transfer. The modification shown in Fig. 2 is the so-called face-down transfer wherein the respective layers 3, 4, and 5 are printed in reverse order over the gum coated paper backing so that the design layer 5 is directly against the gum coating 2 and the clear layer 3 is outermost. Otherwise, the makeup of the transfer is the same as in Fig. 1.

Referring now to Fig. 3, another embodiment of the invention is shown which is particularly useful in instances where somewhat higher temperatures are expected to be encountered. For example, a transfer of the type shown in Fig. 3 is appropriate for decorating or marking metal articles or surfaces which may be subjected to a temperature of from about 400° F. to about 500° F. with occasional intermittent rises to as high as 800° F. This transfer again has the same paper backing 1 with the gum coating 2. However, instead of the clear organosiloxane resin base layer, such as shown at 3 in Fig. 1, this embodiment of the invention utilizes a special metallic base layer 7 disposed directly over the gum coating 2. This metallic base layer 7 is an organosiloxane resin mixture of the general type heretofore described but is pigmented rather heavily with aluminum pigment. Immediately over the base layer 7, a compound color and copy layer 8—9 may be applied but it is preferred that the different colors in the layer be disposed in the form of substantially segregated non-abutting color areas as clearly shown at 8 in Fig. 3. The legend or copy, indicated at 9, is likewise preferably segregated or non-abutting with respect to the color areas 8. Of course, the total thickness of the transfer body comprising the layers 7 and 8—9 should conform to the same thickness limitation heretofore disclosed. The metallic base layer 7 is quite important in preserving the film integrity after the film has been applied to the metal article and its high metallic content serves to dissipate heat more rapidly from the heated article so as to protect the color and copy layers. Again, by way of illustration and not by way of limitation, the following composition represents a typical formulation for a fluid which can be used in forming the metallic base layer 7 by screen printing or other suitable technique:

| | Grams |
|---|---|
| Clear organosiloxane resin formula as described above for layer 3 | 2000 |
| Flake aluminum pigment | 625 |
| Phenyl methyl siloxane fluid (described above for layer 3) | 100 |
| Bentone 18C thickening agent (alkyl ammonium montmorillonite) | 10 |
| Cobalt naphthenate (6% Co) | 1 |

In this embodiment of the invention the metallic layer 7 plays an important role in resisting higher temperatures by dissipating heat and protecting the silicone resins against breakdown and also by improving adherence of the transfer body to the metal surface being decorated or marked. Although Fig. 3 illustrates a face-up transfer, the layers 7 and 8—9 may be interchanged to provide a face-down type transfer.

In Fig. 4 I have illustrated a modification of the embodiment of the invention shown in Fig. 3. In this instance, the transfer body is designed to resist even higher temperatures, e.g. on the order of from about 500° to about 700° F. with occasional intermittent rises to about 1000° F. As will be readily apparent, the transfer comprises the paper backing 1, the gum coating 2, the same metallic base layer 7 as used in Fig. 3, and a superimposed legend or copy layer 10 which is printed directly on the metallic base layer 7 without the use of different color areas 8 such as employed in the Fig. 3 transfer. Also, in this modification of the invention, it is quite important that the size of the letters comprising the copy or text matter 10 be held to minimum dimensions. For example, it is preferable that the lines forming the individual letters of the copy be not over 1/16 inch in width so as to resist popping-off at very high temperatures. Of course, the overall thickness T of the transfer body comprising the layers 7 and 10 should be kept to a minimum thickness, e.g. not over .0015–.002 inch.

Although the invention has been described with particular reference to certain specific embodiments thereof, it is to be understood that various modifications and equivalents may be resorted to without departing from the scope of the invention as defined in the appended claims.

I claim:

1. In a decalcomania transfer having a backing with a release surface, a thin laminar transfer unit removably disposed against said surface and adapted to be released therefrom for application to an article, said transfer unit including at least one layer comprising a plurality of compatible normally solid, heat curable organosiloxane resins, and a normally liquid organosiloxane as a plasticizer for the uncured resins.

2. In a decalcomania transfer having a backing with a release surface, a thin laminar transfer unit removably disposed against said surface and adapted to be released therefrom for application to an article, said transfer unit including at least one layer comprising a plurality of compatible, normally solid, heat curable organosiloxane resins, and a normally liquid organosiloxane as a plasticizer for the uncured resins, at least one of said resins being selected primarily to provide, in the subsequently cured transfer unit after application thereof to the article, high heat resistance and adherence properties, and at least another of said resins being selected to provide improved shelf life and handling properties in the uncured unit and also to provide improved viscosity and printing characteristics in the fluid material employed to form said layer.

3. The article of claim 2 further characterized in that said laminar transfer unit has a total thickness not greater than about .0025 inch.

4. The article of claim 2 further characterized in that said organosiloxane resins are selected from the group consisting of phenyl methyl siloxane polymers and methyl phenyl diphenyl siloxane polymers having different ratios of methyl and phenyl groups per silicon atom.

5. The article of claim 2 further characterized in that said organosiloxane plasticizer comprises a relatively low molecular weight linear polymer.

6. The article of claim 2 further characterized in that said organosiloxane plasticizer comprises a phenyl methyl siloxane fluid.

7. In a decalcomania transfer having a backing with a release surface, a thin laminar transfer unit removably disposed against said surface and adapted to be released therefrom for application to an article, said transfer unit including at least one layer comprising a plurality of compatible, normally solid, heat curable organosiloxane resins, a normally liquid organosiloxane as a plasticizer for the uncured resins, and a catalyst to accelerate curing of the resins upon subsequent transfer of the unit to an article and exposure to an elevated curing temperature.

8. The article of claim 7 further characterized in that said catalyst comprises a soap of an organic acid and a metal selected from the group consisting of zinc and cobalt.

9. The article of claim 2 further characterized in that said layer also comprises a minor amount of a particulate inorganic heat resistant solid material as a binder for strengthening the layer.

10. The article of claim 2 further characterized in that said transfer unit comprises a plurality of organosiloxane resin layers, one of said layers comprising a clear and unpigmented film as a base support for the unit and the remainder of the layers being pigmented.

11. In a decalcomania transfer having a backing with a release surface, a thin laminar transfer unit removably disposed against said surface and adapted to be released therefrom for application to an article, said transfer unit comprising a metallic base layer adapted to be disposed in contact with the surface of the article upon application of the transfer unit thereto, and a heat resistant imprint against said base layer, said base layer and said imprint each comprising a plurality of compatible, normally solid, heat curable organosiloxane resins and a normally liquid organosiloxane as a plasticizer for the uncured resins, and said base layer also containing a metallic pigment.

12. The article of claim 11 further characterized in that said metallic pigment comprises an aluminum pigment.

13. In a decalcomania transfer having a backing with a release surface, a thin laminar transfer unit removably disposed against said surface and adapted to be released therefrom for application to an article, said transfer unit comprising a metallic base layer adapted to be disposed in contact with the surface of the article upon application of the transfer unit thereto, and a heat resistant imprint against said base layer comprising segregated non-abutting color areas, said base layer and said imprint each comprising a plurality of compatible, normally solid, heat curable organosiloxane resins and a normally liquid organosiloxane as a plasticizer for the uncured resins, and said base layer also containing an aluminum pigment.

14. The article of claim 11 further characterized in that said imprint consists of a single layer in only one color and supported directly against said base layer.

15. In the manufacture of a decalcomania transfer having a backing with a release surface and a thin laminar heat resistant transfer unit removably disposed against said surface and adapted to be released therefrom for application to an article subject to elevated temperatures, the step comprising screen printing over said release surface as part of said transfer unit at least one layer of a fluid material comprising a plurality of compatible, normally solid, heat curable organosiloxane resins, a normally liquid organosiloxane as a plasticizer for the uncured resins, and a solvent medium for the resins and plasticizer, at least one of said resins being selected to provide, in the subsequently cured layer after application of the transfer unit to the article, high heat resistance and adherence properties, and at least another of said resins being selected to provide improved shelf life and handling properties in the uncured layer and also to impart adequate viscosity and screen printing qualities to said fluid material.

16. In the decoration or marking of a metal surface adapted to be subjected to elevated temperatures, the method which comprises applying to the unheated metal surface a preformed thin laminar transfer unit comprising a plurality of compatible, normally solid, heat curable organosiloxane resins, temporarily adhering said transfer unit to the metal surface, and thereafter subjecting the metal surface and transfer unit to an elevated temperature above 300° F. whereby to effect curing of the resins and conversion thereof to a highly heat resistant form and whereby to effect permanent adherence of the transfer unit to said metal surface.

17. The method of claim 16 further characterized in that said transfer unit has an outermost base layer containing an aluminum pigment, and said base layer is applied in contact with the metal surface whereby to provide maximum heat dissipation and thermal stability in the applied transfer unit.

References Cited in the file of this patent

UNITED STATES PATENTS

| | | |
|---|---|---|
| 1,968,095 | Poschel | July 31, 1934 |
| 2,245,123 | Belloc | June 10, 1941 |
| 2,419,918 | Scheetz | Apr. 29, 1947 |
| 2,532,941 | Rado | Dec. 5, 1950 |
| 2,566,735 | Lepie | Sept. 4, 1951 |
| 2,601,337 | Smith-Johannsen | June 24, 1952 |
| 2,625,496 | Swift et al. | Jan. 13, 1953 |
| 2,641,562 | Chartrand et al. | June 9, 1953 |
| 2,643,964 | Smith-Johannsen | June 30, 1953 |
| 2,646,379 | Poschel | July 21, 1953 |
| 2,700,629 | Townsend | Jan. 25, 1955 |
| 2,712,514 | English | July 5, 1955 |
| 2,732,318 | Keil | Jan. 24, 1956 |
| 2,736,721 | Dexter | Feb. 28, 1956 |
| 2,895,846 | Schaefer | July 21, 1959 |

OTHER REFERENCES

The Silicone Story: General Electric Bulletin CDS-4 (July 1952); 12 pages, p. 3 of interest.